United States Patent [19]

Furutera et al.

[11] Patent Number: 4,672,821

[45] Date of Patent: Jun. 16, 1987

[54] ABSORPTION-TYPE HEAT PUMP

[75] Inventors: Masaharu Furutera, Maizuru; Tetsuro Furukawa, Suita; Yoshiaki Matsushita, Maizuru; Kenji Nakauchi, Hirakata, all of Japan

[73] Assignee: Hitachi Zosen Corporation, Osaka, Japan

[21] Appl. No.: 800,540

[22] Filed: Nov. 21, 1985

[30] Foreign Application Priority Data

Nov. 24, 1984 [JP] Japan ................................ 59-248387
Jun. 28, 1985 [JP] Japan ................................ 60-143216

[51] Int. Cl.⁴ .......................................... F25B 13/00
[52] U.S. Cl. .................................. 62/324.2; 62/476; 62/238.3
[58] Field of Search ............... 62/476, 148, 238.3, 62/324.2; 165/104.16

[56] References Cited

U.S. PATENT DOCUMENTS 3,392,547 7/1968 Hopkins ............................. 62/476
4,458,499 7/1984 Grossman ........................ 62/476 X
4,458,500 7/1984 Grossman et al. ............... 62/494 X Primary Examiner—Lloyd L. King
Attorney, Agent, or Firm—Barnes, Kisselle, Raisch, Choate, Whittemore & Hulbert

[57] ABSTRACT

An absorption-type heat pump includes an evaporator 1, an absorber 7, a regenerator 12, and a condenser 17. In the evaporator 1, water 4 as a refrigerant is flash-evaporated through a flash evaporating device 2. The water vapor 6 from the evaporator 1 is absorbed into an absorbent consisting of an aqueous lithium bromide solution in the absorber 7, so that a heat carrier fluid 8 is heated by the heat of absorption evolved within the absorber. In the regenerator 12, the diluted absorbent 9 received from the absorber 7 is heated with a heating fluid 13, whereby the absorbed water content of the absorbent 9 is evaporated. The concentrated absorbent 14 resulting from the step of regeneration is returned to the absorber 7, while the water vapor 16 evolved in the regenerator 12 is introduced into the condenser 17. The heat carrier fluid 8, which has been heated in the absorber 7, is passed through the condenser 17, being further heated by the heat of condensation within the condenser 17.

11 Claims, 2 Drawing Figures

ABSORPTION-TYPE HEAT PUMP

FIELD OF THE INVENTION

This invention relates to an absorption-type heat pump and, more particularly, to an absorption-type heat pump which employs water as a refrigerant and an aqueous lithium bromide (LiBr) solution as an absorbent.

BACKGROUND ART

An absorption-type heat pump of the type which uses water and an aqueous lithium bromide solution is disclosed in Japanese Published Unexamined Patent Application No. 55-63364, for example. This system consists chiefly of an evaporator, an absorber, a regenerator, and a condenser. In the evaporator, water (refrigerant) is evaporated via a plurality of heat transfer tubes through which a first heating fluid passes. The water vapor from the evaporator is absorbed into an aqueous solution of lithium bromide (absorbent) in the absorber, so that a heat carrier fluid passed through the absorber is heated by the heat of absorption generated in the course of the absorption. In the regenerator, the diluted absorbent received from the absorber through a heat exchanger is heated with a second heating fluid so that the absorbed water is evaporated from the absorbent. The concentrated absorbent resulting from the regeneration process is returned through the aforementioned heat exchanger to the absorber, in which it is reused for the water vapor absorption. In the condenser, the water vapor introduced thereinto from the regenerator is cooled to condense by a plurality of heat transfer tubes through which a cooling fluid is caused to flow.

In the above prior-art heat pump, the evaporation of water in the evaporator is carried out indirectly through the intermediary of the heat transfer tubes through which the first heating fluid is caused to flow. Therefore in order to improve the rate of heat exchange between the water and the heating fluid, it is necessary to increase the heat transfer tubes in number so as to increase the area of heat conduction, consequently leading to a cost disadvantage. Another problem with such heat pump is that even if the heat transfer tubes are increased in number, it is yet inevitable that the outlet temperature of the heating fluid is higher than the temperature of the water vapor produced, the full utilization of the heat of the heating fluid being impossible despite a utilizable temperature difference still remaining between the heating fluid and the water vapor.

DISCLOSURE OF THE INVENTION

An object of this invention is to provide an absorption-type heat pump which is advantageous in cost and has a high operating efficiency.

In order to accomplish this object, the invention provides an absorption-type heat pump comprising an evaporating unit for flash-evaporating a refrigerant supplied thereinto, an absorbing unit in which the refrigerant vapor received from the evaporating unit is absorbed into a liquid absorbent with the generation of heat to heat a heat carrier fluid, a regenerating unit for concentrating the diluted absorbent received from the absorbing unit by heating same with a heating fluid to evaporate the refrigerant content thereof so that the absorbent is reused in the absorbing unit, and a condensing unit for condensing the refrigerant vapor received thereinto from the regenerating unit.

According to the above arrangement, the refrigerant is flash-evaporated in the evaporating unit by utilizing the inherent heat thereof, consequently obviating the provision of heat transfer tubes which would lead to ineffective utilization of heat.

In accordance with a preferred embodiment of the invention, the heat carrier fluid flowing through the absorbing unit is caused to pass through the condensing unit after it leaves the absorbing unit, and is reheated by the heat of condensation generated in the condensing unit. In this case, the heat carrier fluid functions also as a cooling fluid for condensation, while it effectively collects both the heat of absorption in the absorbing unit and the heat of condensation in the condensing unit.

According to another preferred embodiment of the invention, the heating fluid which flows through the regenerating unit consists of the same substance as the refrigerant, and after leaving the regenerating unit it is flash-evaporated as a refrigerant in the evaporating unit. This arrangement is suited for constituting a high-temperature operated heat pump, since the heating fluid, after it has left the regenerating unit, still has a sufficiently high temperature.

The condensation of the refrigerant vapor in the condensing unit may be advantageously carried out by causing the refrigerant vapor to go into direct contact with a liquid of the same substance supplied by spraying. The arrangement in this case, as opposed to the prior art heat pump wherein condensation is conducted indirectly through a large number of heat transfer tubes, is simple in construction, advantageous in cost, and has increased possibility of size reduction.

Various features and advantages of the invention will be readily appreciated from the following description of embodiments thereof taken in connection with the accompanying drawings.

DESCRIPTION OF EMBODIMENTS

Figure 1:
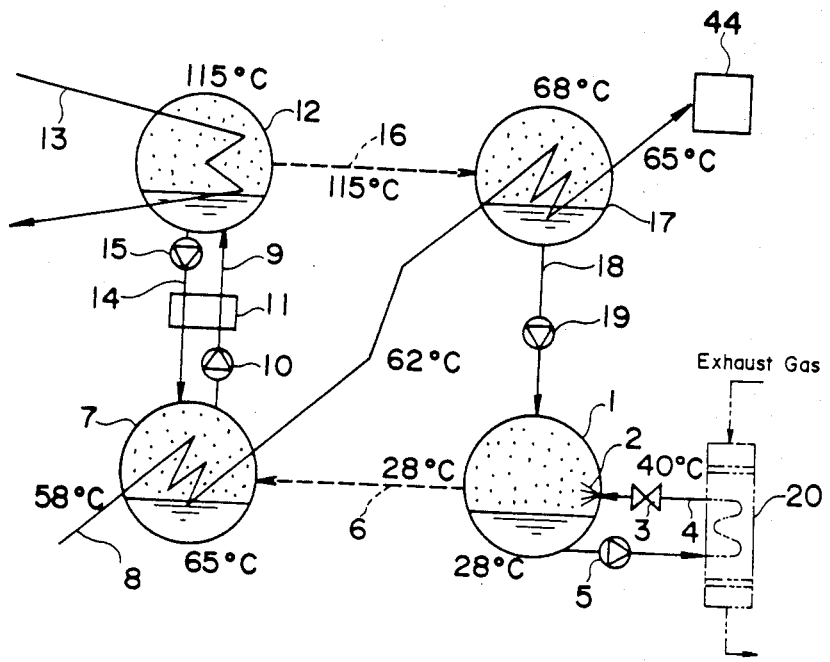
FIG. 1 is a schematic diagram showing one form of absorption-type heat pump embodying the invention.

In FIG. 1 showing a low-temperature operated absorption-type heat pump, reference numeral 1 designates an evaporator including flash evaporating means 2. The flash evaporating means 2 is supplied with water 4 of 40° C., for example, as a refrigerant through a pressure reducing valve 3, a portion of the water 4 being caused to evaporate when it leaves the flash evaporating means 2. The portion of the water 4 remaining unevaporated and having its temperature lowered to 28° C., for example, is discharged to the outside by means of a pump 5 (disregard the part illustrated in phantom lines). The temperature of water vapor 6 generated in the evaporator 1 is 28° C., for example, and the pressure inside the evaporator 1 is about 28 mmHg, for example.

In an absorber 7, the water vapor 6 from the evaporator 1 is absorbed into an absorbent consisting of a lithium bromide solution, and an incoming stream of heat carrier fluid 8 having an inlet temperature of 58° C., for example, is heated to 62° C., for example, by the heat of absorption generated in the course of the absorption.

The pressure inside the absorber 7 is also about 28 mmHg. The diluted absorbent 9 resulting from the absorption of the water vapor 6 is pumped out of the absorber 7 at 65° C., for example, by means of a pump 10, and then passed through a heat exchanger 11, whereby the diluted absorbent 9 is heated to 100° C., for example, being subsequently supplied to a regenerator 12. Such preheating of the absorbent 9 prior to its entry into the regenerator 12 is intended to reduce the thermal input requirements of the regenerator 12.

In the regenerator 12 there is present a heating fluid 13 passing therethrough, the heat of which serves to evaporate the absorbed water content of the diluted absorbent 9. The concentrated absorbent 14 resulting from the regeneration process is caused to leave the regenerator 12 at an outlet temperature of 115° C., for example, by means of a pump 15, and has its temperature lowered to 80° C., for example, as it passes through aforesaid heat exchanger 11, the absorbent 14 being subsequently returned to the absorber 7, in which it is reused for the absorption process. The pressure inside the regenerator 12 is 220 mmHg, and the temperature of the water vapor 16 generated therein is 115° C. The inlet and outlet temperatures of the heating fluid 13 are 125° C. and 120° C. respectively, for example.

The water vapor 16 of 115° C. from the regenerator 12 serves to heat further to 65° C., for example, the heat carrier fluid 8 which has been already heated to 62° C. by passage through the absorber 7, the vapor 16 itself being condensed to water at a temperature of 68° C. The pressure within the condenser 17 is also about 220 mmHg. The condensate 18 is supplied as a heat source to the evaporator 1 by means of a pump 19. The heat carrier fluid 8, after passing through the condenser 17, is supplied to an external utilization system 44 such as a district or central heating system of the direct heat exchange type.

As a modification of the above arrangement, the water collected in the evaporator 1 may be passed in a closed passage by the pump 5 back to the evaporator 1 for repeated flash evaporation through a waste gas cooler 20 illustrated in phantom lines. According to this modification, since a completely closed circuit is formed for the flow of the refrigerant (water), it is possible to avoid the ingress into the refrigeration system of non-condensable gases such as air which would invite vacuum leakage and efficiency deterioration. It should be noted that the aqueous lithium bromide (absorbent) becomes corrosive in the presence of air, and for this reason also the ingress of air must be prevented.

Figure 2:
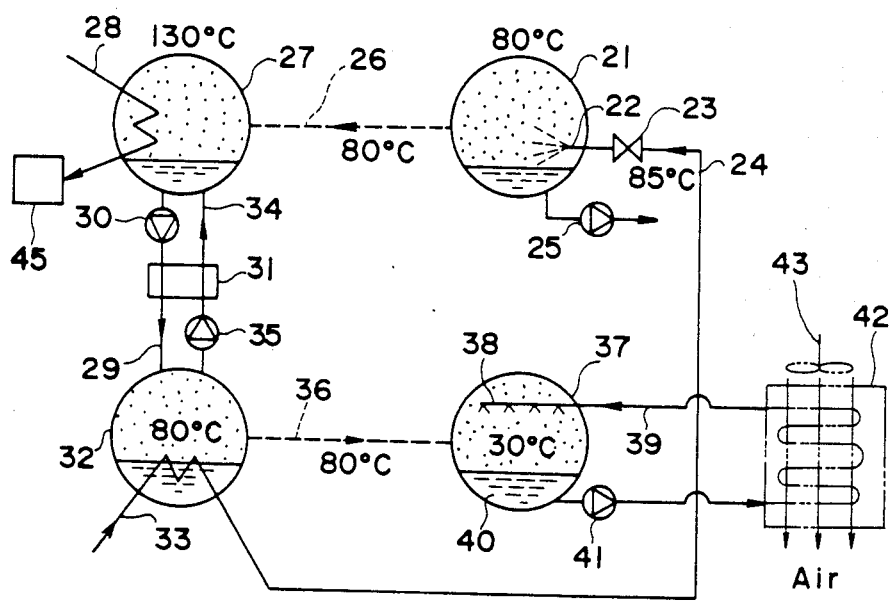
FIG. 2 is a schematic block diagram showing another embodiment of absorption-type heat pump in accordance with the invention.

Similarly to the FIG. 1 embodiment, a high-temperature operated absorption-type heat pump shown in FIG. 2 includes an evaporator 21, an absorber 27, a heat exchanger 31, a regenerator 32, and a condenser 37.

The evaporator 21 includes flash evaporating means 22, which is supplied with a high temperature water 24 of 85° C., for example, through a pressure reducing valve 23, a portion of the water 24 being allowed to evaporate as it leaves the flash evaporator means 22. The portion of the water 24 remaining unevaporated and having its temperature lowered to 80° C., for example, is discharged to the outside by means of a pump 25 (disregard the part illustrated in phantom lines). The temperature of the water vapor 26 generated in the evaporator 26 is 80° C., and the pressure inside the evaporator 21 is 360 mmHg.

In the absorber 27, the water vapor 26 from the evaporator 21 is absorbed into an absorbent consisting of an aqueous lithium bromide solution, and an incoming stream of heat carrier fluid 28 having an inlet temperature of 90° C., for example, is heated to 125° C. by heat of absorption evolved in the course of such absorption. The pressure inside the absorber 27 is also about 360 mmHg. The heat carrier fluid 28 is subsequently supplied to an external utilization system 45 for utilization therein. The diluted absorbent 29 resulting from the water vapor absorption is caused to leave the absorber 27 at an outlet temperature of 130° C., for example, by means of a pump 30 and is then passed through a heat exchanger 31, whereby its temperature is lowered to 85° C., for example, the absorbent 29 being subsequently supplied to the regenerator 32.

Heating water 33 with an inlet temperature of 90° C., for example, is caused to pass through the regenerator 32, so that the absorbed water content of the diluted absorbent 29 is evaporated by the heat of the heating water 33. The concentrated absorbent 34 resulting from the regeneration process leaves the regenerator 32 at an outlet temperature of 80° C., for example, and is then caused to pass through the aforesaid heat exchanger 31, whereby its temperature is increased to 125° C., for example, so as to adapt to the operating temperature of the absorber 27, the absorbent 34 being subsequently returned to the absorber 27, in which it is reused for the absorption process. The pressure inside the regenerator 32 is 32 mmHg, and the temperature of the water vapor 36 evolved therein is 80° C. The heating water 33, even after having left the regenerator 33, still maintains a high temperature of 85° C., for example. As such, the water 30, if sufficiently pure, is supplied as the refrigerant (high temperature water) 24 to the evaporator 21 for flash evaporation. In the case of having insufficient purity, the water 33 may be transferred to the evaporator 21 as a heat source to assist the flash evaporation.

In the condenser 37, water 39 of 24° C., for example, is supplied by spraying through spray means 38, and the water vapor 36 from the regenerator 36 is efficiently condensed by direct contact with the sprayed water 39. The condensed water 40 of 30° C., for example, which has been collected is discharged outside by means of a pump 41 (disregard the part illustrated in phantom lines).

In a modification of the FIG. 2 embodiment, condensed water 40 collected in the condenser 37 may be passe in a closed passage by the pump 41 through an indirect cooler such as an air-cooled heat exchanger 42 provided with a fan 43 and returned to the condenser 37 for the condensation process, as illustrated in phantom lines. Further alternatively, the condensed water 40 may be transferred by the pump 41 through the absorber 27 as the heat carrier fluid 28 and through an district or central heating system 45, and thereafter fed back to the condenser 37 as the condensing water 39.

It is to be understood that the various temperatures referred to in conjunction with the above described two embodiments are for illustrative purposes only, and should not be construed to limit the invention, and that the scope of the invention is defined solely by the appended claims only.

What is claimed is:

1. An absorption-type heat pump comprising an evaporating unit for flash-evaporating a refrigerant supplied thereinto, an absorbing unit in which the refrigerant vapor received from the evaporating unit is absorbed into a liquid absorbent with the generation of heat to heat a heat carrier fluid, a regenerating unit for concentrating the diluted absorbent received from the absorbing unit by heating same with a heating fluid to evaporate the refrigerant content thereof so that the absorbent is reused in the absorbing unit, and a condensing unit condensing the refrigerant vapor received thereinto from the regenerating unit, the liquid phase refrigerant collected in the evaporating unit from the condensing unit being passed through a closed passage to the evaporating unit for repeated flash evaporation, the closed passage heating the liquid phase refrigerant in heat exchange.

2. A heat pump as set forth in claim 11 wherein the heat carrier fluid, after having left the absorbing unit, is passed through the condensing unit so that it is reheated by the heat of condensation evolved therein.

3. A heat pump as set forth in claim 2 wherein the heat carrier fluid secondarily heated in the condensing unit is supplied to a district or central heating system.

4. An absorption-type heat pump comprising an evaporating unit for flash-evaporating a refrigerant supplied thereinto, an absorbing unit in which the refrigerant vapor received from the evaporating unit is absorbed into a liquid absorbent with the generation of heat to heat a heat carrier fluid, a regenerating unit for concentrating the diluted absorbent received from the absorbing unit by heating same with a heating fluid to evaporate the refrigerant content thereof so that the absorbent is reused in the absorbing unit, and a condensing unit for condensing the refrigerant vapor received thereinto from the regenerating unit, the condensed liquid phase refrigerant in the condensing unit being discharged therefrom.

5. A heat pump as set forth in claim 4 wherein the refrigerant vapor received from the regenerating unit is condensed in the condensing unit by direct contact with a liquid of the same substance introduced thereinto by spraying.

6. A heat pump as set forth in claim 5 wherein the liquid phase refrigerant collected in the condensing unit is passed in a closed passage through an indirect cooler and returned to the condensing unit for the condensation of the refrigerant vapor.

7. A heat pump as set forth in claim 6 wherein the indirect cooler is an air-cooled heat exchanger.

8. A heat pump as set forth in claim 1 wherein the diluted absorbent supplied from the absorbing unit to the regenerating unit and the concentrated absorbent supplied from the latter unit to the former unit are heat exchanged in a heat exchanger.

9. A heat pump as set forth in claim 1 wherein the refrigerant is a water, and the absorbent is an aqueous lithium bromide solution.

10. A heat pump as set forth in claim 4 wherein the diluted absorbent supplied from the absorbing unit to the regenerating unit and the concentrated absorbent supplied from the latter unit to the former unit are heat exchanged in a heat exchanger.

11. A heat pump as set forth in claim 4 wherein the refrigerant is a water, and the absorbent in an aqueous lithium bromide solution.

* * * * *